US011140877B2

(12) United States Patent
Haney et al.

(10) Patent No.: US 11,140,877 B2
(45) Date of Patent: Oct. 12, 2021

(54) TOP-FILL HUMMINGBIRD FEEDER WITH VENTED PRESS FIT CAP

(71) Applicant: WOODSTREAM CORPORATION, Lititz, PA (US)

(72) Inventors: Luke Benjamin Haney, Lititz, PA (US); Steven Charles Lorraine, Glastonbury, CT (US)

(73) Assignee: Woodstream Corporation, Lancaster, PA (US)

( * ) Notice: Subject to any disclaimer, the term of this patent is extended or adjusted under 35 U.S.C. 154(b) by 238 days.

(21) Appl. No.: 16/367,710

(22) Filed: Mar. 28, 2019

(65) Prior Publication Data

US 2019/0320619 A1    Oct. 24, 2019

Related U.S. Application Data

(60) Provisional application No. 62/661,860, filed on Apr. 24, 2018.

(51) Int. Cl.
*A01K 39/02* (2006.01)
(52) U.S. Cl.
CPC ................ *A01K 39/0206* (2013.01)
(58) Field of Classification Search
CPC .... A01K 39/0206; A01K 39/02; A01K 39/00; A01K 39/012; A01K 39/01; A01K 39/024; A01K 39/026; A01K 7/00; A01K 5/0225; B65D 1/0246; B65D 1/06
See application file for complete search history.

(56) References Cited

U.S. PATENT DOCUMENTS

| 3,089,605 A * | 5/1963 | Buonauro ............ B65D 81/36 215/377 |
| 3,526,335 A * | 9/1970 | Swett ................... B65D 81/36 220/630 |
| 4,607,597 A * | 8/1986 | Sevigny ............... A01K 39/012 119/51.01 |
| 4,901,673 A * | 2/1990 | Overstreet ............ A01K 39/00 119/72 |
| 5,682,835 A * | 11/1997 | Walter ................. A01K 39/012 119/57.8 |
| 6,792,891 B1 * | 9/2004 | Coburn ................. A01K 39/02 119/57.8 |
| 7,861,671 B2 * | 1/2011 | Carter ................ A01K 39/0206 119/72 |
| 8,522,717 B2 * | 9/2013 | Carter ................. A01K 39/026 119/72 |
| 8,763,558 B2 * | 7/2014 | Gauker ............. A01K 39/0206 119/78 |
| 8,950,359 B2 * | 2/2015 | Chen ..................... A01K 39/01 119/51.01 |
| 9,351,479 B2 * | 5/2016 | Chen ................. A01K 39/0206 |
| 2014/0137804 A1 * | 5/2014 | Chen ................. A01K 39/0206 119/72 |
| 2014/0261200 A1 * | 9/2014 | Tu ......................... A01K 39/01 119/57.8 |

* cited by examiner

*Primary Examiner* — Kristen C Hayes
(74) *Attorney, Agent, or Firm* — Barley Snyder (57) ABSTRACT

A top-fill hummingbird feeder is provided having a nectar container removably coupled to a feeding basin, the nectar container including a top opening closed by a cap. The cap has a sealing member configured to have an interference press fit with the top opening of the nectar container. The sealing member includes at least one void to allow air passage so that liquid can flow from the nectar container into the feeding basin when the feeder is in use.

12 Claims, 11 Drawing Sheets

TOP-FILL HUMMINGBIRD FEEDER WITH VENTED PRESS FIT CAP

This application claims priority from U.S. provisional application Ser. No. 62/661,860, filed Apr. 24, 2018.

BACKGROUND OF THE INVENTION

Field of the Invention

The present invention is related to the field of hummingbird feeders and, more particularly, to a top-fill hummingbird feeder having a cap with a vented press fit seal.

Description of the Related Art

Many top-fill hummingbird feeders have threaded screw-on caps. To provide the venting needed to allow liquid to flow from the nectar container into the bottom reservoir of the feeder, a separate vent may be provided in the upper surface of the cap. As some users may experience difficulty with screw-on caps, it would be advantageous to have a hummingbird feeder with a different cap design and, in particular, one that improves ease of use when opening and closing.

SUMMARY OF THE INVENTION

In view of the foregoing, the present invention is directed to a top-fill hummingbird feeder that includes a feeding basin removably coupled below a nectar container with a top opening, and a cap with a sealing member to close the container top opening. The sealing member is configured to have an interference press fit within the top opening to secure the cap to the nectar container while voids in the perimeter of the sealing member allow air passage so that liquid in the container can flow freely into the feeding basin of the feeder when in use.

Accordingly, it is an object of the present invention to provide a top-fill hummingbird feeder having a cap with a sealing member that engages within the top opening of the nectar container with an interference press fit, the sealing member having at least one void in the perimeter thereof to allow air passage so that liquid in the nectar container can flow freely into the feeding basin when the cap is in place.

Another object of the present invention is to provide a top-fill hummingbird feeder in accordance with the preceding object in which the sealing member is a separate element from the cap.

Still another object of the present invention is to provide a top-fill hummingbird feeder in accordance with the first object in which the sealing member is integral with the cap.

Yet another object of the present invention is to provide a top-fill hummingbird feeder in accordance with any of the preceding objects in which the outer side or the perimeter of the sealing member includes a plurality of outer fins vertically spaced from one another, the voids being formed in the fins.

A further object of the present invention is to provide a top-fill hummingbird feeder in accordance with the preceding object in which at least some of the voids in adjacent fins are vertically aligned with one another.

A still further object of the present invention is to provide a top-fill hummingbird feeder in accordance with any of the preceding objects in which the sealing member is annular and the voids are formed as notches in the outer edge thereof, the notches having a limited radial extent.

Another object of the present invention is to provide a top-fill hummingbird feeder having an interference press fit cap that is vented to allow nectar to flow from the nectar container into the feeding basin, the feeder being easy to assemble and disassemble to provide an improved user experience while maintaining proper top-fill functionality.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiment described herein is disclosed by way of illustration only. It is not intended that the invention be limited in its scope to the details of construction and arrangement of components set forth in the following description or illustrated in the drawings. Also, in describing a preferred embodiment, specific terminology will be resorted to for the sake of clarity. It is to be understood that each specific term includes all technical equivalents which operate in a similar manner to accomplish a similar purpose.

Figures 1, 1A:
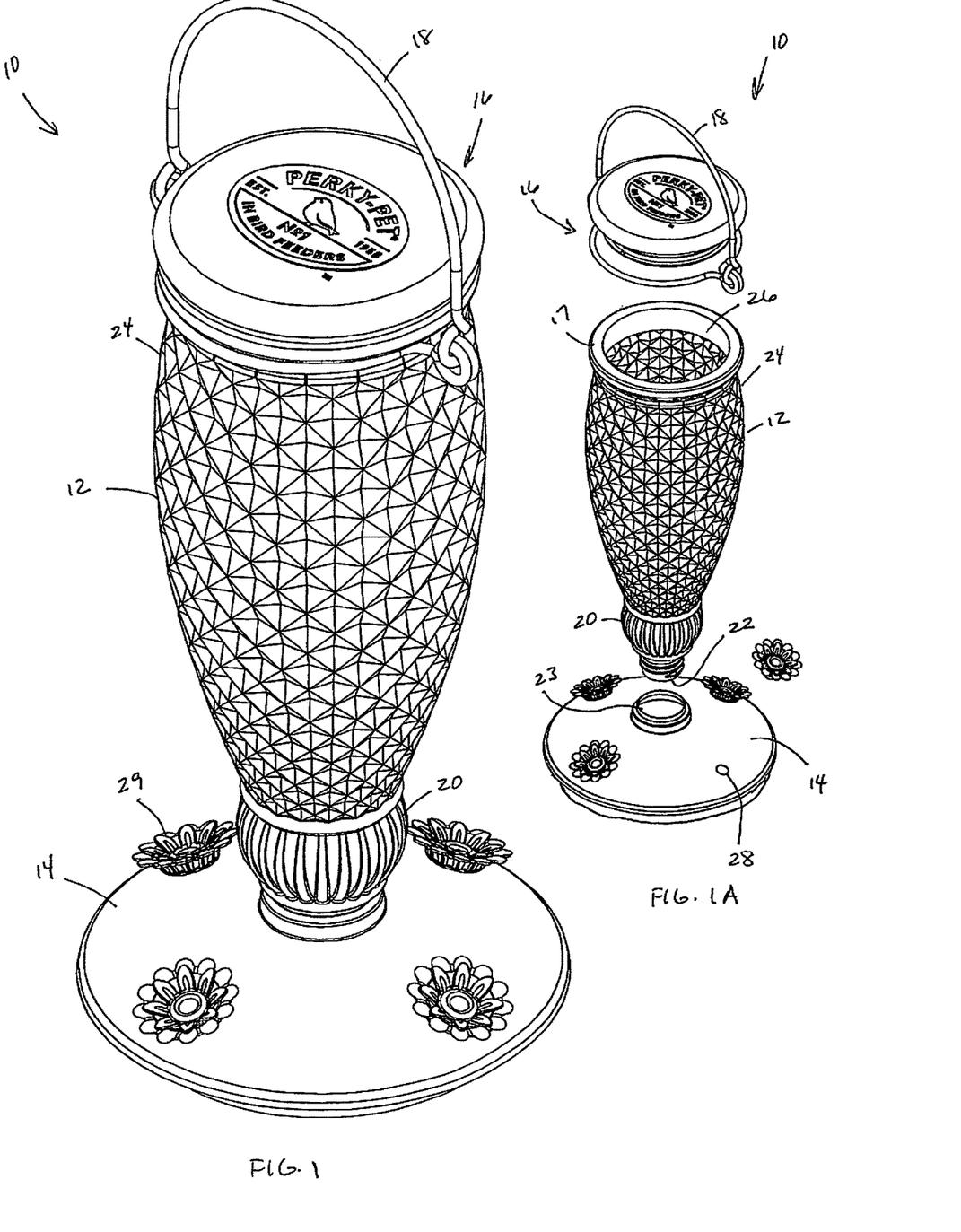
FIG. 1 is a perspective view of a top-fill hummingbird feeder in accordance with the present invention.
FIG. 1A is a partially exploded view of the hummingbird feeder shown in FIG. 1.

As shown in FIGS. 1 and 1A, the present invention is directed to a top-fill hummingbird feeder generally designated by reference numeral 10. The feeder includes a nectar container 12, a feeding basin 14 and a cap assembly generally designated by reference numeral 16. The feeder is also provided with a hanger 18 that, in the embodiment shown, is secured below a widened upper rim 17 on the container 12.

The nectar container 12 includes a lower end 20 with a bottom opening 22 and an upper end 24 with a top opening 26. The feeding basin 14 is removably coupled to the lower end 20 of the nectar container 12 and has a top opening 23 that is in liquid flow communication with the container bottom opening 22. Nectar held in the container flows through the bottom opening 22 and into the feeding basin 14 through the top opening 23 thereof and is accessed by hummingbirds through feed ports 28 in the basin 14, which can be fitted with artificial flower assemblies 29, in the manner known by persons skilled in the art.

Figure 2:
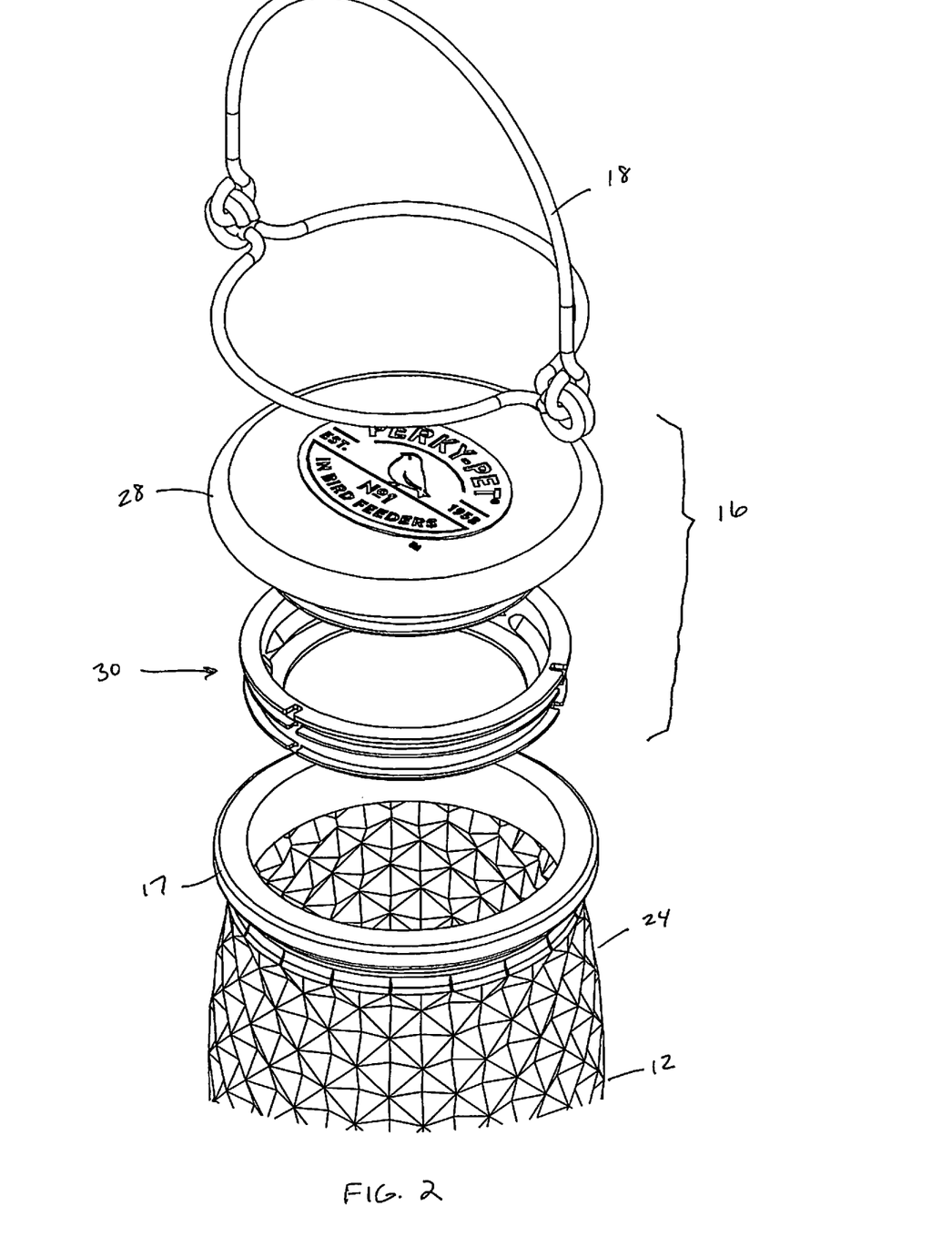
FIG. 2 is an enlarged exploded view of the cap assembly of the top-fill hummingbird feeder shown in FIG. 1.

As shown in FIG. 2, the cap assembly 16 includes a cap 28 and a sealing member generally designated by reference numeral 30. In the embodiment shown, the sealing member 30 is a separate element but in an alternate configuration the sealing member 30 could be formed integrally with the cap 28.

Figure 3:
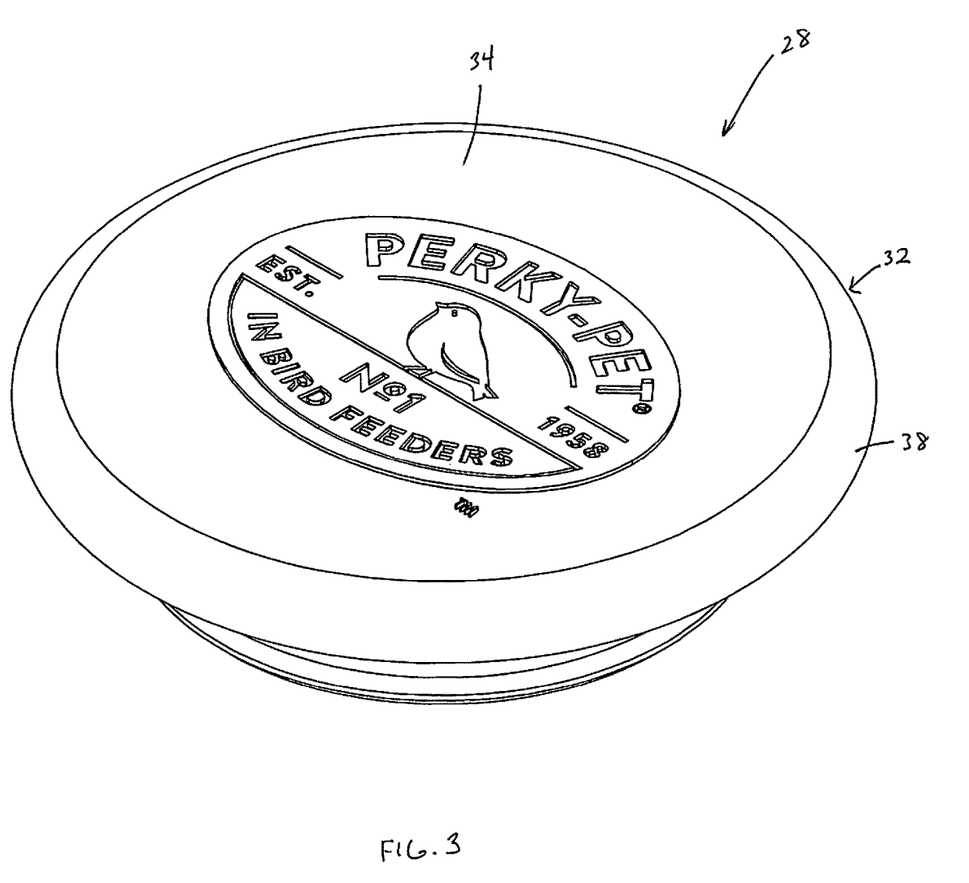
FIG. 3 is an upper perspective view of the cap shown in FIG. 2.
Figure 4:
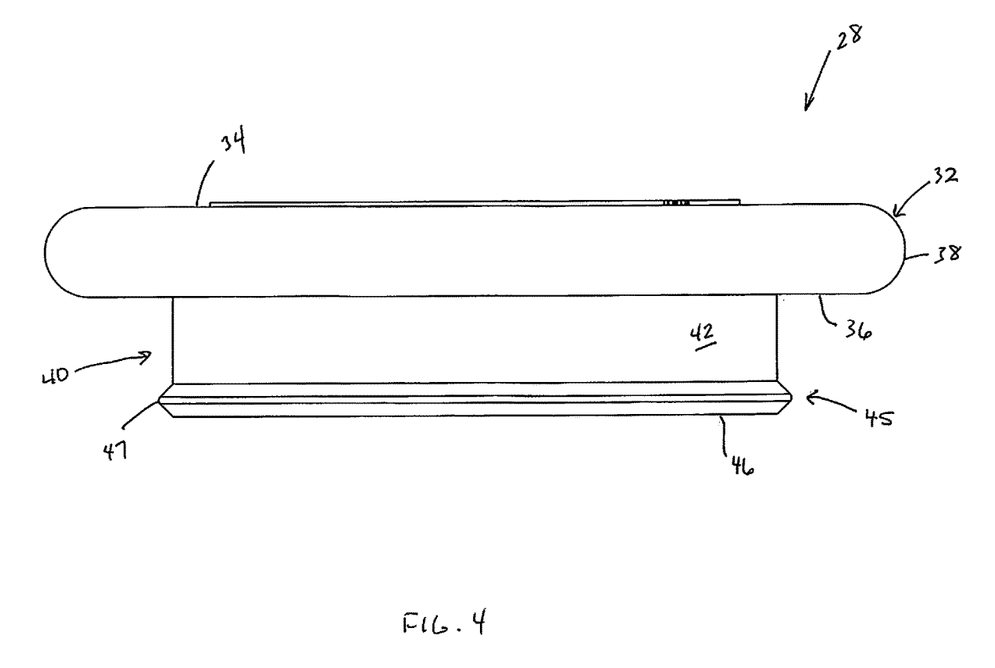
FIG. 4 is a side view of the cap shown in FIG. 2.
Figure 5:
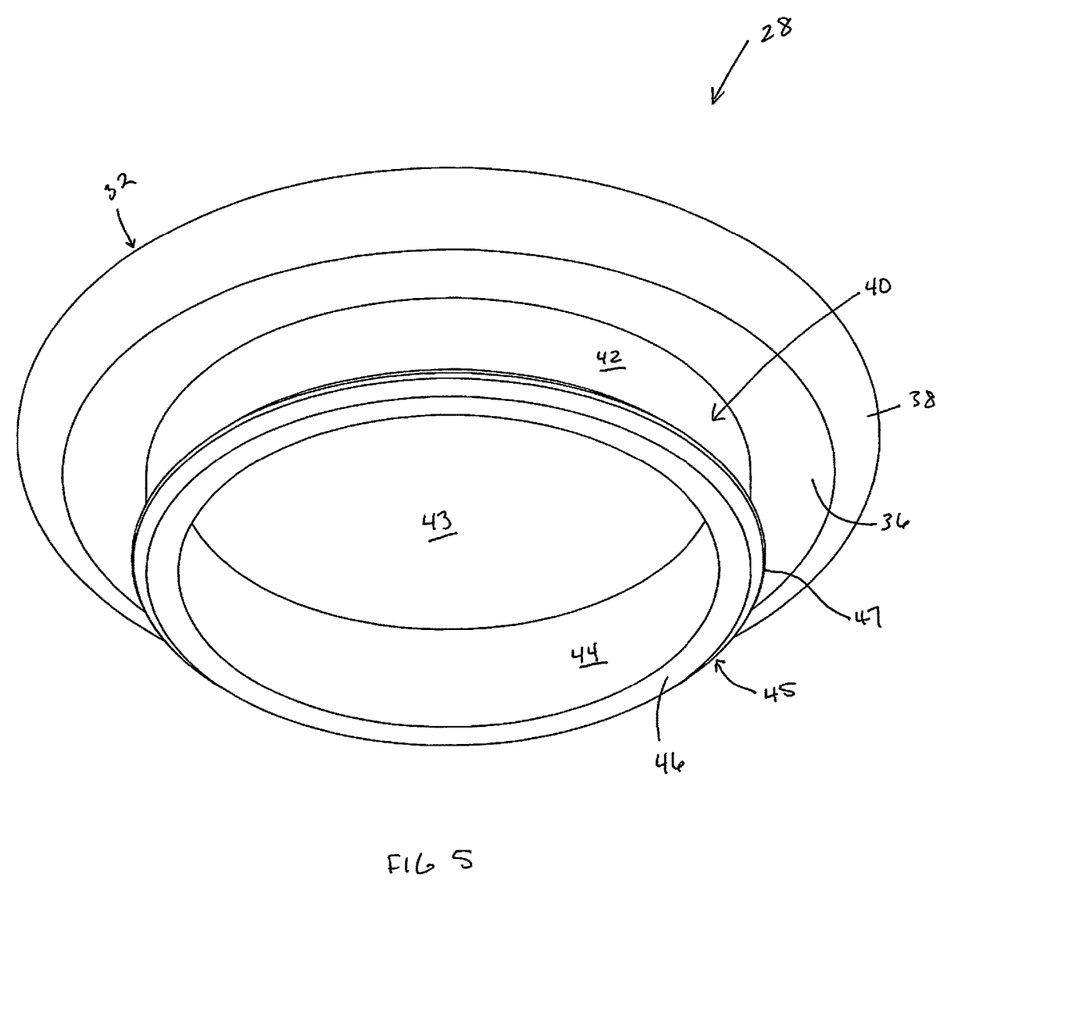
FIG. 5 is a lower perspective view of the cap shown in FIG. 2.

As shown in various views in FIGS. 3-5, the cap 28 as shown includes a head, generally designated by reference numeral 32, having a generally flat upper surface 34, a generally flat bottom surface 36 and, preferably, a rounded outer edge 38. While the head 32 is shown as being disk-shaped, other shapes could be utilized as desired. The bottom surface 36 of the cap 28 includes a downwardly projecting annular rim, generally designated by reference numeral 40, having an outer surface 42, an inner surface 44 and a bottom edge 46 that surrounds a hollow center area 43. Alternatively, the center area 43 of the cap head inside the rim could be solid so that the bottom edge is replaced by a planar surface (not shown). Adjacent the bottom edge 46 is an annular lower ridge generally designated by reference numeral 45. The lower ridge 45 projects outwardly from the plane of the rim to create a lip 47 that is greater in diameter than the diameter of the rim 40 (see FIG. 4). As with the shape of the head, the downwardly projecting rim 40, as well as the annular lower ridge 45, could have a shape other than annular so long as the shape of the top opening 26 of the container 12 is complementary thereto such that the rim 40 and ridge 45 of the cap 28 will fit within the top opening of the container as will be described further hereinafter. Hence, if the container had a square top opening, the downwardly projecting rim with the ridge 45 adjacent the bottom edge 46 thereof would also be square, and with like correspondence applying to other possible shapes.

Figure 6:
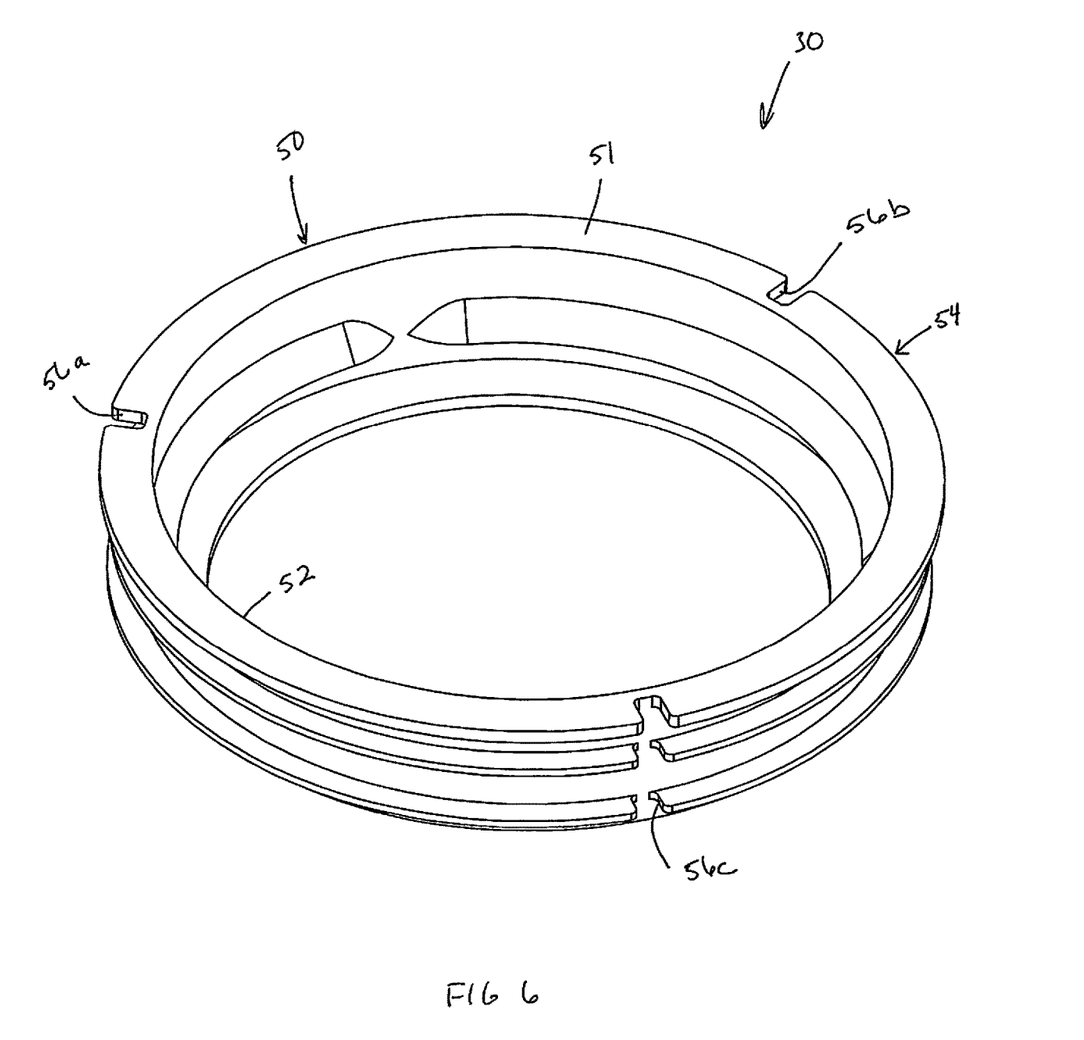
FIG. 6 is an upper perspective view of the sealing member shown in FIG. 2.
Figure 7:
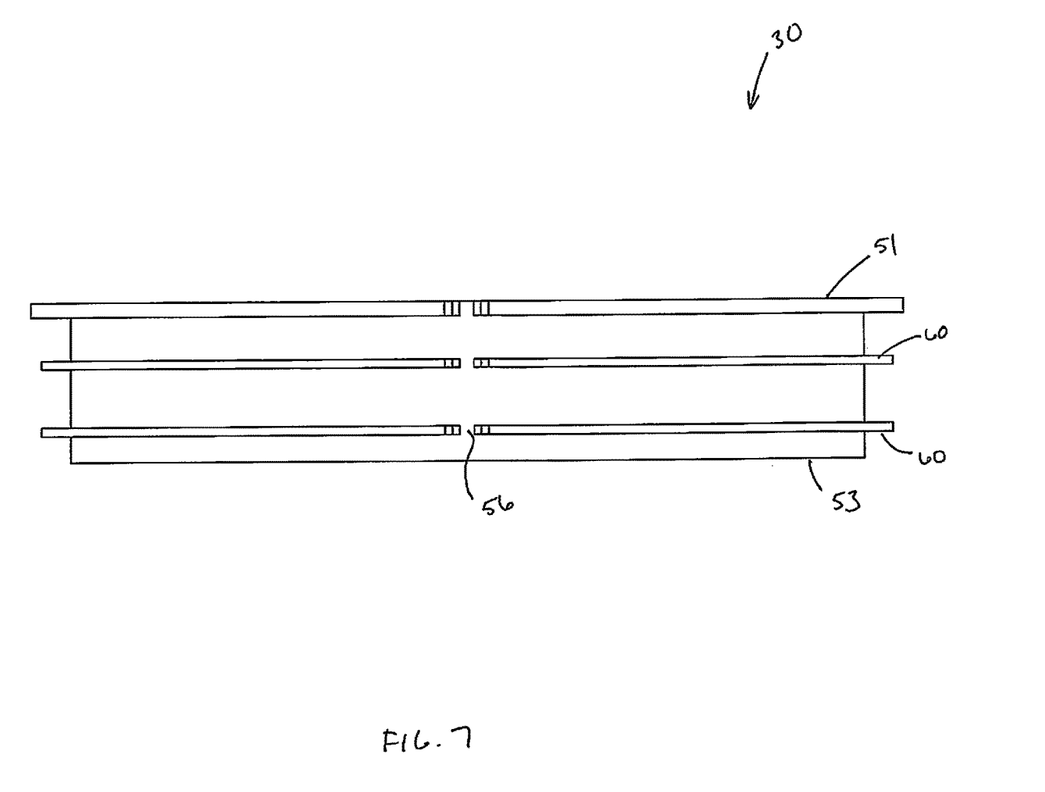
FIG. 7 is a side view of the sealing member shown in FIG. 2.
Figure 8:
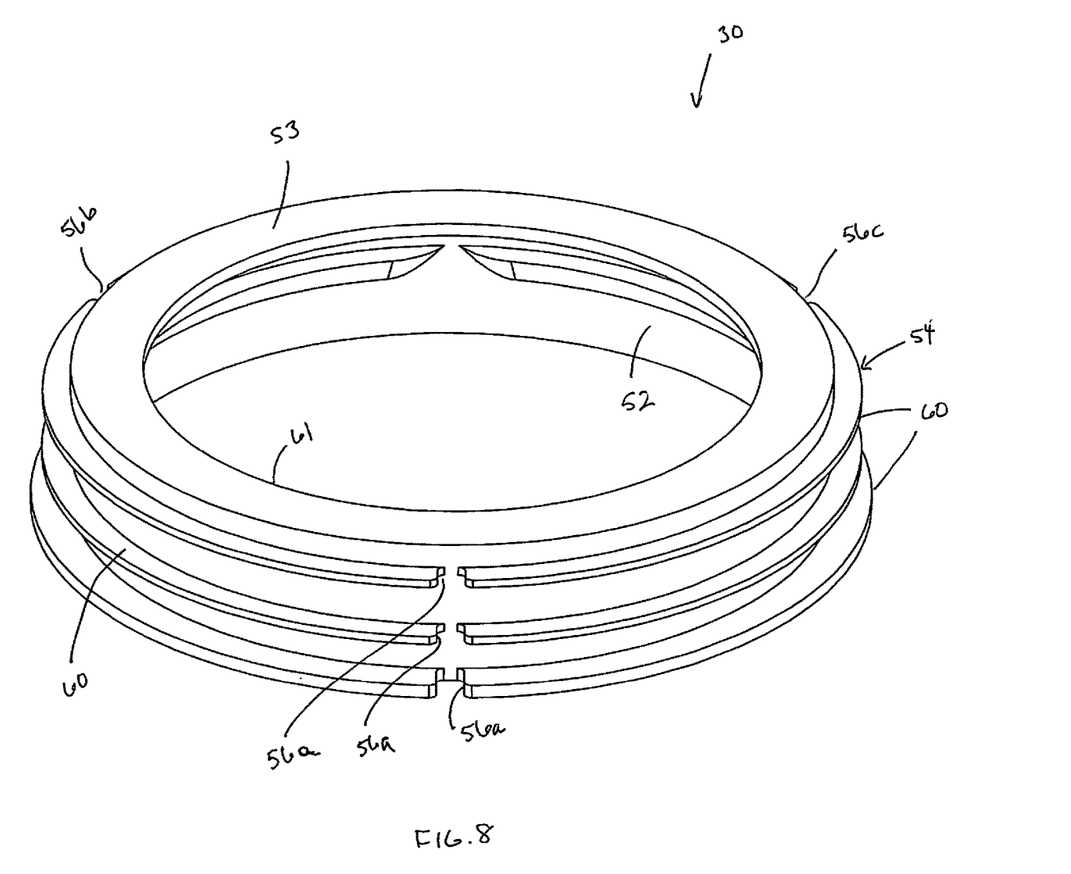
FIG. 8 is a lower perspective view of the sealing member shown in FIG. 2.

Various views of the sealing member 30 are shown in FIGS. 6-8. In the embodiment shown, the sealing member 30 includes an annular ring generally designated by reference numeral 50 having an inner face 51, an inner side 52, an outer face 53 and an outer side generally designated by reference numeral 54. The outer diameter of the outer face 53 is smaller than the outer diameter of the inner face 51 as shown in FIG. 7. Likewise, the outer face 53 of the ring 50 has an inner edge 61 with a smaller diameter than the diameter of the ring inner side 52 adjacent the inner face 51.

Figure 9:
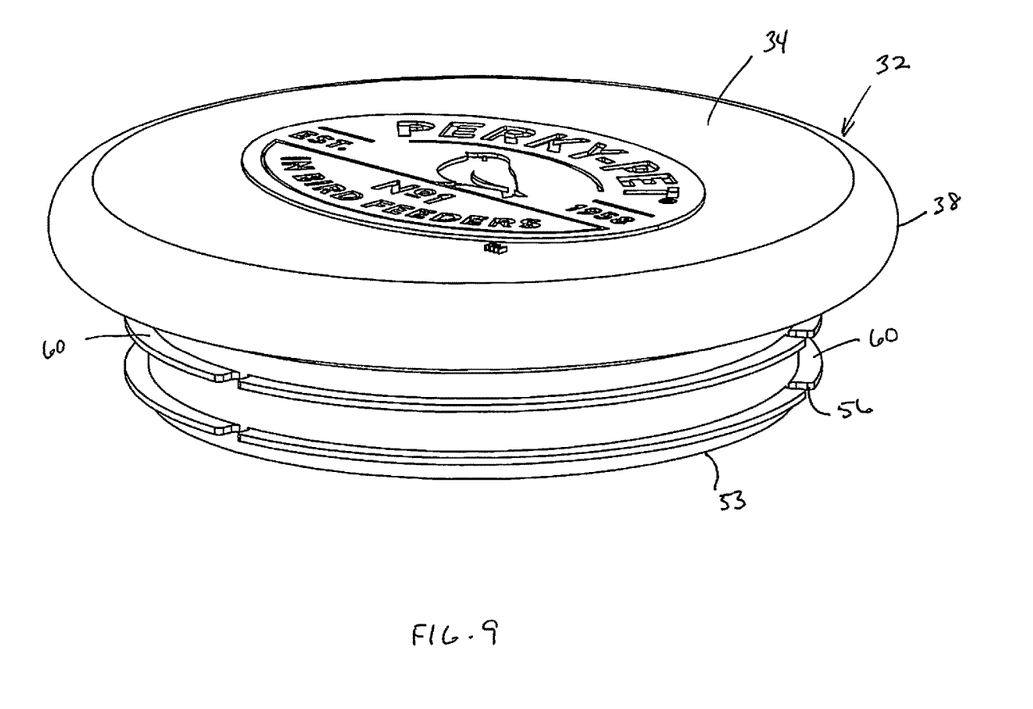
FIG. 9 is an upper perspective view of the cap and sealing member shown in FIG. 2 as assembled.
Figure 10:
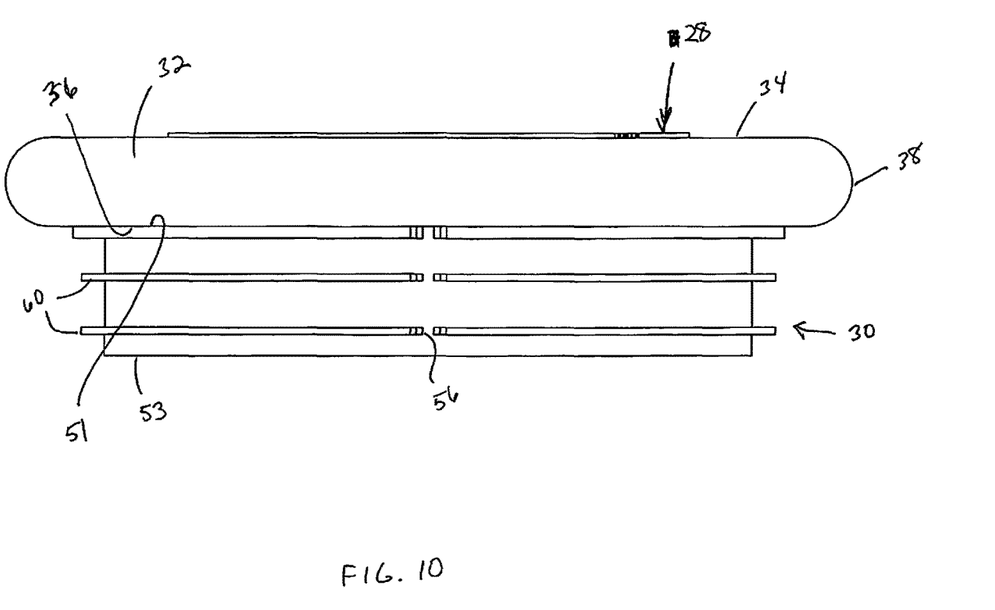
FIG. 10 is a side view of the cap assembly shown in FIG. 9.
Figure 11:
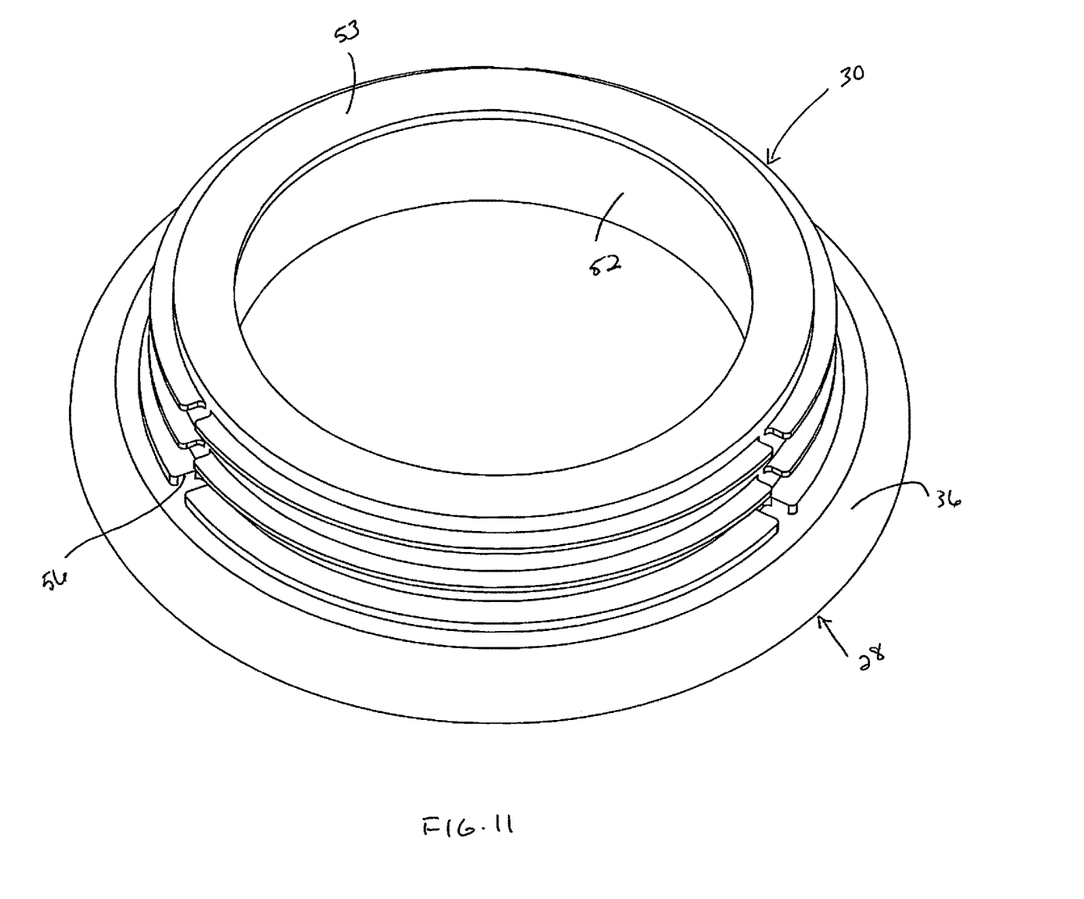
FIG. 11 is a lower perspective view of the cap assembly shown in FIG. 9.

When the sealing member 30 is mounted on the cap 28 as shown in FIGS. 9-11, the ring 50 encircles the cap rim 40, the inner side 52 of the ring 50 is in abutment with the outer surface 42 of the annular rim 40, and the inner face 51 of the ring 50 is in abutment with the bottom surface 36 of the cap. The outer face 53 of the ring 50 covers the bottom edge 46 of the cap 28 as shown in FIG. 11, while the lip 47 anchors the sealing member 30 on the rim with an interference fit. The outer side 54 of the ring is configured for an interference press fit within the top opening 26 of the nectar container 12 when the cap and container are assembled for use.

The outer side 54 of the sealing member ring 50 also includes at least one void 56 that allows air passage therethrough. The voids 56 are preferably formed as notches in the outer edge of the outer side, the notches having a limited radial extent such that the inner edge of the inner side 52 of the ring is solid. The outer face 53 of the ring also has a solid inner edge as well as a solid outer edge (see FIG. 8). With the void(s) 56 in the outer side 54, air may flow through the cap into the nectar container 12 so that liquid is able to flow from the nectar container into the feeding basin 14 when the feeder 10 is in use.

In the embodiment shown herein, the outer side 54 of the sealing member ring 50 includes a plurality of fins 60 that are vertically spaced from one another, with each fin 60 having at least one void 56 therein. The cutouts for the notches or voids 56 in the fins are preferably as deep as the extension of the fins 60, with the depth of the notches or voids 56 being preferably about 0.100 inches and the width of the voids also being preferably about 0.100 inches. At least some of the voids 56 in adjacent fins are vertically aligned with one another. More particularly, in the embodiment shown, there are three fins with each fin having three voids 56a, 56b, 56c (see FIG. 6) that are spaced around the outer perimeter of the outer side 54, preferably at substantially equidistant intervals. Voids 56a in each of the three fins are vertically aligned with one another (see FIGS. 7 and 8). Similarly, voids 56b in each of the three fins are vertically aligned, as are voids 56c in each of the three fins.

As would be understood, different numbers of fins and voids may be used, and the fins may include voids that are not vertically aligned with the voids in adjacent fins. The voids could also be formed as small holes in the fins while the outer edge on the ring outer side is solid. All that is required is that air passages are formed, either through alignment of the voids or through a combination of the voids with a continuous channel formed between vertically adjacent fins, through which air may flow through the cap and into the container to avoid a vacuum in the container that would prevent nectar from flowing into the feeding basin 14.

The top-fill hummingbird feeder having a vented interference press fit cap according to the present invention maintains proper top-fill functionality while being easy to assemble and disassemble, thus providing an improved user experience.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A top-fill hummingbird feeder comprising:
   a nectar container having a lower end with a bottom opening and an upper end with a top opening;
   a feeding basin removably coupled to the lower end of the nectar container and in liquid flow communication with said bottom opening;
   a cap including a downwardly projecting annular rim on a bottom surface thereof; and
   a sealing member separate from the cap and including an annular ring that encircles the cap rim with an inner edge of said sealing member being in abutment with an outer surface of said annular rim when the sealing member is mounted to the cap, the sealing member configured for an interference press fit with the top opening of the nectar container, the sealing member including at least one void to allow air passage so that liquid is able to flow from the nectar container into the feeding basin when the feeder is in use.

2. The top-fill hummingbird feeder as set forth in claim 1, wherein an outer perimeter edge of said ring includes a plurality of fins vertically spaced from one another, each fin having at least one void therein.

3. The top-fill hummingbird feeder as set forth in claim 2, wherein at least some of the voids in adjacent fins are vertically aligned with one another.

4. The top-fill hummingbird feeder as set forth in claim 3, wherein the voids are formed as notches having a limited radial extent.

5. A top-fill hummingbird feeder comprising:
   a nectar container having a lower end with a bottom opening and an upper end with a top opening;
   a feeding basin removably coupled the lower end of the nectar container and in liquid flow communication with said bottom opening; and
   a cap assembly for closing the top opening of the nectar container, the cap assembly including a cap and a sealing member configured for an interference press fit within the top opening of the nectar container, the sealing member including a plurality of fins each having at least one void therein to allow air passage through said voids so that liquid is able to flow from the nectar container into the feeding basin when the feeder is in use.

6. The top-fill hummingbird feeder as set forth in claim 5, wherein the cap includes a downwardly projecting annular rim on a bottom surface thereof, said sealing member including an annular ring that encircles the cap rim with an inner edge of said sealing member being in abutment with an outer surface of said annular rim when the sealing member is mounted to the cap.

7. The top-fill hummingbird feeder as set forth in claim 5, wherein at least some of the voids in adjacent fins are vertically aligned with one another.

8. The top-fill hummingbird feeder as set forth in claim 7, wherein the voids are formed as notches having a limited radial extent.

9. A top-fill hummingbird feeder comprising:
   a nectar container having a lower end with a bottom opening and an upper end with a top opening;
   a cap including a downwardly projecting annular rim on a bottom surface thereof; and
   a sealing member including an annular ring that encircles the cap rim with an inner edge of said sealing member being in abutment with an outer surface of said annular rim when the sealing member is mounted to the cap, the sealing member configured for an interference press fit with the top opening of the nectar container, the sealing member including at least one void to allow air passage so that liquid is able to flow from the nectar container into a feeding basin of the feeder when the feeder is in use.

10. The top-fill hummingbird feeder as set forth in claim 9, wherein an outer perimeter edge of said ring includes a plurality of fins vertically spaced from one another, each fin having at least one void therein.

11. The top-fill hummingbird feeder as set forth in claim 10, wherein at least some of the voids in adjacent fins are vertically aligned with one another.

12. The top-fill hummingbird feeder as set forth in claim 11, wherein the voids are formed as notches having a limited radial extent.

* * * * *